UNITED STATES PATENT OFFICE.

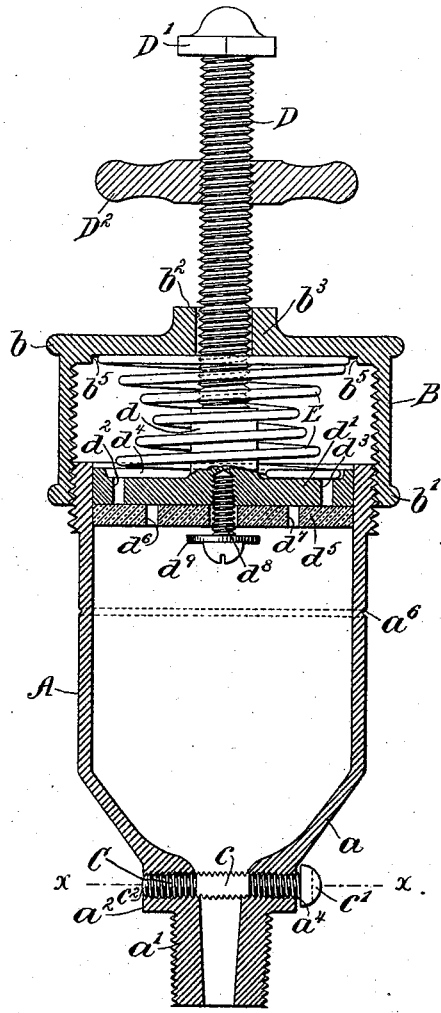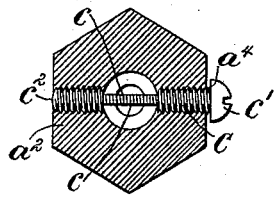

GOTTLOB BINDER, OF PHILADELPHIA, PENNSYLVANIA.

LUBRICATOR.

SPECIFICATION forming part of Letters Patent No. 525,089, dated August 28, 1894.

Application filed April 13, 1894. Serial No. 507,373. (No model.)

*To all whom it may concern:*

Be it known that I, GOTTLOB BINDER, a citizen of the United States, residing at the city of Philadelphia, in the county of Philadelphia and State of Pennsylvania, have invented certain new and useful Improvements in Lubricators, of which the following is a specification.

My invention has relation to lubricators in which the lubricant is contained within a cup and the same is forced therefrom by means of a spring actuated plunger operating within the cup; and in such connection it relates more particularly to the general construction and arrangement of such a lubricator for various purposes.

The principal objects of my invention are, first, to provide a simple, inexpensive and efficient lubricator adapted to contain grease or the like and provided with means whereby the discharge of grease therefrom to journals or bearings of machinery to which the same is applied is maintained under due regulation; second, to provide an automatic grease cup provided with an integral discharge nipple or nozzle having a screw valve adapted to limit, as well as control, the discharge of grease therethrough; third, to provide an automatic grease cup with a detachable cap having a spring controlled plunger and with means connected therewith for preventing the grease while filling or during removal of the cap from being withdrawn by back suction from the outlet nipple of the device, which would tend for the time being to leave the journal dry; and fourth, to provide a lubricator adapted for grease or the like having the parts thereof greatly simplified for enhancing the effective action thereof and so arranged as to permit of the ready detachment of the operative parts of the lubricator by the removal of the cap from the cup or bowl thereof in order to permit of repairs thereto, refilling of the same or for other purposes.

My invention consists of a lubricator constructed, arranged and adapted for operation in substantially the manner hereinafter described and claimed.

The nature and scope of my invention will be more fully understood from the following description taken in connection with the accompanying drawings forming part hereof, and in which—

Figure 1, is a view partly in vertical central section and partly in elevation of an automatic grease cup or lubricator embodying the features of my invention; and Fig. 2, is a cross sectional view through the nozzle thereof formed integral with the lower portion of the cup on the line $x$—$x$, of Fig. 1.

Referring to the drawings A, is the cup, bowl or housing for the thick grease or other suitable lubricant having a tapering lower extremity $a$, terminating in an integral nozzle or nipple $a'$, having a threaded exterior surface for permitting of the securing of the same into a complemental threaded opening provided in the journal or bearing of a certain part of machinery. The upper end of the nozzle or nipple $a'$, is provided with an enlargement or shoulder $a^2$, for the application, if necessary, of a wrench thereto for securing the threaded nozzle or nipple $a'$, to the said bearing or journal.

$a^6$, is a ridge or groove formed in the body of the housing or bowl A, for indicating when the lubricant has been completely discharged therefrom, and the cap B, is screwed all the way down and so as to rest against the top edge of the cup or bowl and with the lower end of the said cap brought flush with said ridge or notch. The upper portion of the cup, bowl or housing A, is threaded for the reception of an internally threaded cap B, having top and bottom exterior ribs $b$ and $b'$, and with a central opening $b^2$, in the top and with a shoulder or rim $b^3$, formed integral therewith for permitting of a nut or tightening device being brought into engagement therewith for a purpose to be presently explained. In the wall of the shoulder $a^2$, and extending crosswise through the body thereof is a threaded opening $a^4$, and into which opening is inserted a threaded stem valve C, which at or about the middle thereof is flattened on both sides at $c$, and said stem having a slotted head $c'$, at one end and rounded at $c^2$, at the opposite end, as clearly shown in Figs. 1 and 2. This threaded stem valve C, is so arranged as to permit of the free exit of the lubricant from the cup, bowl or housing A, yet at the same time by simply a one quarter turn of the same the discharge of the lubricant can be reduced three-fourths or thereabout of the entire area of discharge afforded through the contracted nozzle or nipple $a'$, as will be seen by reference to the drawings. It may be here remarked that by such arrangement the discharge of the lubricant cannot be cut off entirely, which is desirable. Yet if the feed is greater than is necessary it can be very appreciably reduced with the slightest movement of the stem valve C. Moreover, the journal cannot become dry through the lack of supply of oil or grease thereto.

D, is a threaded stem, extending downward through the threaded opening $b^2$, in the cap B, and engaging with a socketed bearing $d$, formed integral with a disk or head $d'$, having air openings $d^2$ and $d^3$, extending therethrough. The upper end of said stem is provided with a hexagonal cap, nut or the like $D'$.

$D^2$, is a jam-nut or tightener mounted on the stem and adapted to be screwed upward and downward thereon. The top of the disk or head $d'$, near the periphery thereof is provided with a flange or rim $d^4$, forming with the top a seat for one end of an inversely arranged helical spring E, the opposite end of which is seated to the top of the cap B, within the annular rim $b^5$ thereof, as clearly shown in Fig. 1. As to the double taper spring E, the coils of the same surround the socketed bearing and threaded stem of the plunger and the respective extremities thereof engage the top of said cap and plunger in such manner, due to the construction of the spring, that under compression of the same there is insured a pressure of the plunger against the grease in the bowl which is substantially proportional to the displacement thereof. Moreover, the said spring is compressed as the cap is screwed down over the bowl until the lower edge of the same comes flush with the notch $a^6$, in the exterior surface thereof and during periodical turnings of the cap B, on the threaded portion of the bowl A, the said double taper spring E, will be compressed to a greater or less degree, until the said notch $a^6$, is reached, when the grease will have been entirely removed from the device. It may then be refilled by the unscrewing of the cap B, which causes the plunger $d'$, to be raised, thereby admitting air, but in so doing, leaving the grease deposited through the nozzle or nipple $a'$, of the device onto the bearing, undisturbed. The discharge of the grease through the nozzle $a'$, can be regulated, but not stopped, until the device is emptied of the lubricating substance. By a slight movement of the screw threaded and flattened surface valve C, located in the nozzle $a'$, of the device, the flow of the oil or grease is entirely regulated or controlled, but cannot be stopped in passage thereby through the said nozzle or nipple $a'$. The feed of the grease is started or stopped by simply screwing the T-handle nut or jamming device $D^2$, either against the top nut $D'$, on the end of the stem or against the shoulder or rim $b^3$, of the cap B, as will be readily seen by reference to Fig. 1, of the drawings.

$d^5$, is a gasket or washer of rubber, metal or other suitable material provided with air openings $d^6$ and $d^7$, therein. The perforated disk or head $d'$, and washer or gasket $d^5$, fit snugly against the internal wall of the cup, bowl or housing A, so that no air can escape thereat to interfere with the effective action of the plunger of the device. The washer or gasket $d^5$, is held so as to have a slight movement toward and from the plunger head or disk $d'$, by means of a headed screw $d^8$, extending into the socketed bearing $d$, and which screw carries a washer $d^9$, abutting against the head of the same. In the normal use of the spring actuated perforated plunger head, the washer or gasket $d^5$, will rest against the front face thereof and thus prevent air gaining access to the openings therein, but when the plunger or piston head is drawn upward the gasket or washer $d^5$, will be caused thereby to assume a position away from the plunger head or disk and in contact with the upper surface of the washer $d^9$, thereby permitting air to enter through the openings provided in the gasket or washer $d^5$, and in due course to pass through the openings in the plunger or disk $d'$, into the space between the top of the cup or bowl A, and the cap B, preventing back suction, which if the air did not relieve any tendency thereto would draw upward again the lubricant through the throat of the nozzle or nipple $a'$, into the bowl A, and leave temporarily and during refilling of the cup or bowl A, with a lubricant, the journal to which the nozzle is applied dry or without oil, thereby preventing the efficient working of the shaft or movable member of machinery carried thereby and receiving by means of the hereinbefore described device proper lubrication for obviating heating up of the same.

The lubricator constructed and arranged as hereinbefore described is used as follows:— In order to remove the cap B, so as to apply a consistent lubricating substance, such as grease or the like to the cup, bowl or housing A, the threaded stem D, of the plunger head or disk $d'$, is manipulated by means of the tightening device $D^2$, so that the stem may extend as far as possible beyond the shoulder $b^2$, of the cap by the jamming of the tightener against the said shoulder $b^2$, and with the spring E, compressed between the cap and the top of the plunger head $d'$, and with the gasket $d^5$, resting against the surface of the washer $d^9$, of the screw $d^8$, thereby permitting air to pass through the respective openings in the gasket and plunger head and preventing thereby any back suction of the grease through the nozzle or nipple $a'$, of the cup or bowl A, into the interior thereof. The cap B, is then unscrewed from the bowl A, and the latter filled up with its required quantity of the lubricant and the cap again applied to the exterior threaded portion of the bowl A, the tightening device $D^2$, then caused to assume a position at the upper portion of the stem D, and the spring actuated plunger head with its movable gasket $d^5$, occupying the position shown in Fig. 1, in contact with the body of the lubricant, will cause a regulated discharge under the pressure of the spring E, in a downward direction through the nozzle $a'$, onto the journal or bearing to be lubricated. The quantity of discharge, it will be understood, is controlled by means of the stem valve C, in the shouldered portion of the nozzle $a'$, of the device. When the supply of the lubricant has decreased under the pressure of the spring E, the same may be increased by one or more turns of the cap on the threaded portion of the cup or bowl A, as will be readily observed by reference to Fig. 1. This may be continued until the rim $b^3$, of the cap B, engages with the top surface of the cup or bowl A, and the supply of lubricant therein is exhausted, which will be ascertained when the lower end of the cap B, is brought flush with the notch or groove $a^6$, in the exterior surface of the bowl A, as shown in Fig. 1. At the same time and in fact during the discharge of the lubricant through the device and contracted nozzle $a'$ thereof, the perforated washer or gasket $d^5$, and plunger head or disk $d'$, will respectively occupy the positions illustrated in Fig. 1, and none of the grease can possibly escape into or through the respective openings provided in both of them; and moreover, the air cannot escape through said openings until the stem D, is drawn upward in order to remove the cap for refilling the cup or bowl A, and the spring E, has been brought under compression by the contraction of the position thereof.

Having thus described the nature and objects of my invention, what I claim as new, and desire to secure by Letters Patent, is—

1. A lubricator, comprising a bowl having a tapering outlet nozzle with a valve for regulating the flow of lubricant therethrough, a detachable cap, a spring actuated flat circular plunger having openings extending therethrough, and a washer or gasket having openings extending therethrough and movably connected with said plunger, substantially as and for the purposes set forth.

2. A lubricator, comprising a bowl having a tapering outlet nozzle with a valve for regulating the flow of lubricant therethrough, a detachable cap, a plunger having perforations extending through the same, a movable perforated gasket or washer connected with said plunger, a threaded stem engaging said plunger and carrying beyond said cap a jamming device movable thereon, and a double taper spring interposed between and engaging at the respective ends thereof with said cap and plunger, substantially as and for the purposes set forth.

In testimony whereof I have hereunto set my signature in the presence of two subscribing witnesses.

GOTTLOB BINDER.

Witnesses:
 RICHARD C. MAXWELL,
 LOUIS WINTERBERGER.